Dec. 4, 1923.
A. KÉGRESSE
1,476,082
WHEEL AND RUNNER OR SKI ASSEMBLING DEVICE
Filed Jan. 25, 1922
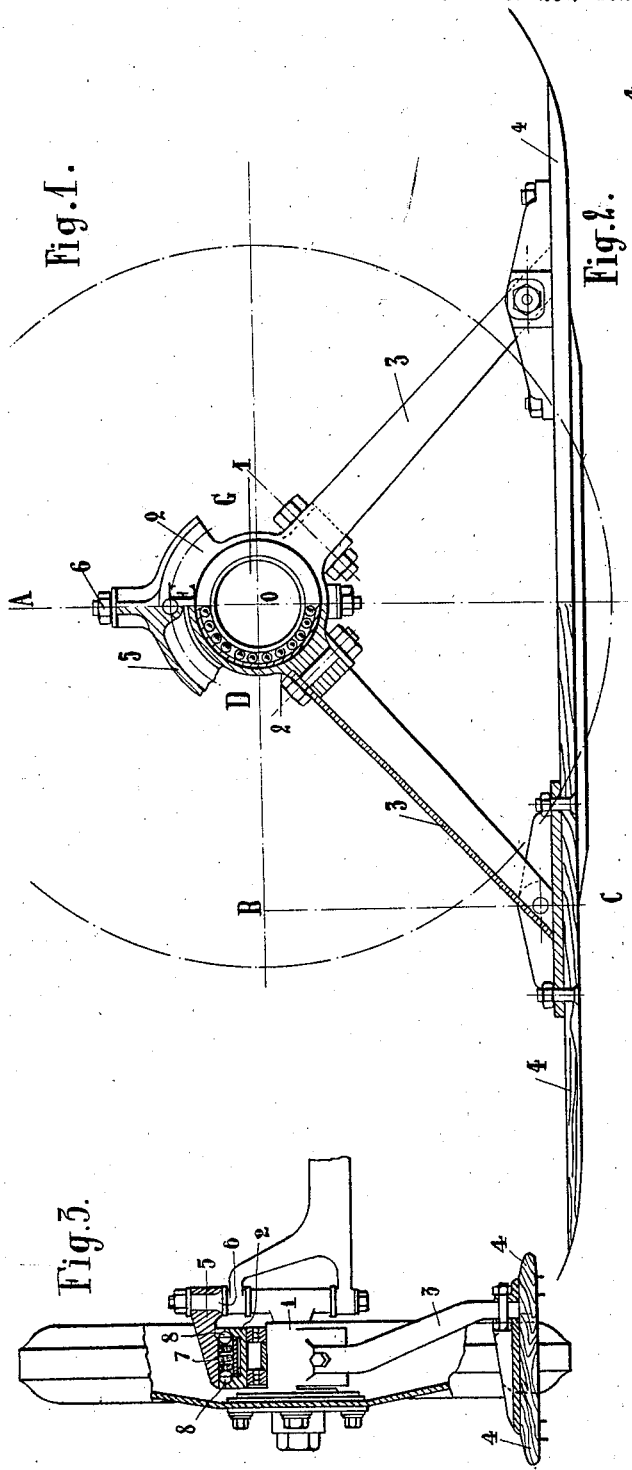
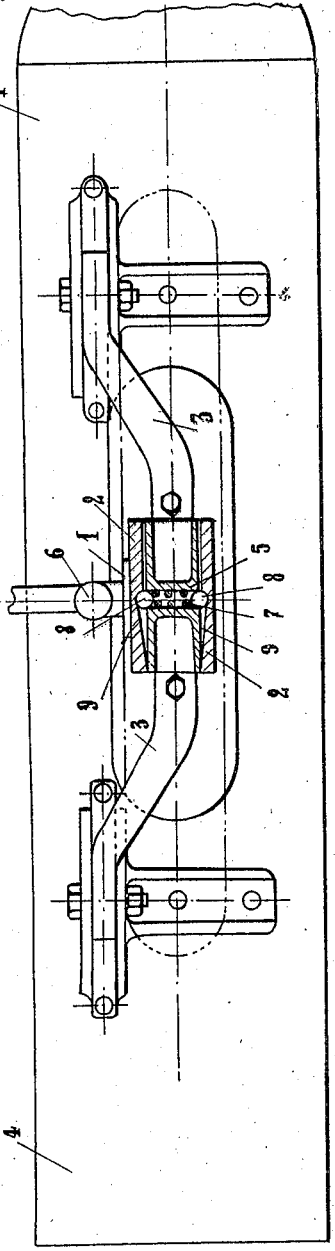
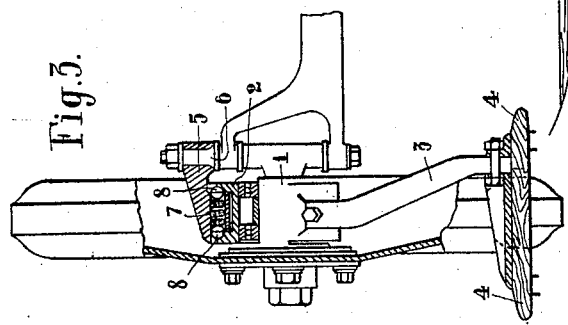
INVENTOR
Adolphe Kégressé
BY
*[signature]*
ATTORNEY Patented Dec. 4, 1923.

1,476,082

UNITED STATES PATENT OFFICE.

ADOLPHE KÉGRESSE, OF PARIS, FRANCE.

WHEEL AND RUNNER OR SKI ASSEMBLING DEVICE.

Application filed January 25, 1922. Serial No. 531,775.

*To all whom it may concern:*

Be it known that I, ADOLPHE KÉGRESSE, citizen of the Republic of France, and resident of Paris, France, have invented a new and useful Wheel and Runner or Ski Assembling Device, which improvements are fully set forth in the following specification.

The present invention relates to attachments for vehicle wheels; and its object, briefly stated, is the provision of an improved device for combining with the wheels of a vehicle of any character a runner or ski in such a manner as to enable it to rock about the hub of the wheel, as well as to swing with the wheel, when the latter is being steered, about the same axis as the wheel itself. The device also serves to maintain the runner balanced clear of the ground when not in action, and to absorb the lateral shocks to which the runner may be subjected without affecting the wheel hub.

In order to make my invention more clearly understood, I have illustrated in and by the appended drawings and as an example an embodiment of the same as applied to a solid or disk wheel.

In the said drawings:

Figure 1 is a view partly in side elevation and partly in vertical section, showing the invention in use.

Figure 2 is a plan view, also partly sectional, on line D—E—G, Fig. 1.

Figure 3 is a transverse vertical section on line A—E—O—B—C, Fig. 1.

On hub 1 (Figures 1, 2 and 3) of the vehicle is freely mounted, for instance on ball-bearings, a ring or collar 2, having upper and lower peripheral shoulders; the upper shoulders forming a pair of cheeks, while the lower shoulders provide a pair of seats in which are secured the upper ends of two diverging struts or braces 3 whose lower ends are connected to the ski or runner 4 adjacent the ends thereof.

Between the cheeks on the upper part of the collar 2 there is fitted, with a slight degree of friction, an arm 5 which, in its turn, is mounted, likewise with slight friction, upon the upper end of the spindle 6 of the wheel. The part of arm 5 which is directly engaged with said cheeks is formed with a transverse recess or hole in which is housed a spring 7 (Figures 2 and 3) bearing at opposite ends against two balls 8 thereby pressed down into notches 9 suitably shaped and provided in the inner faces of the cheeks. The position and shape of notches 9 will, due to spring 7 and the balls 8, maintain the runner or ski in position; but the runner will nevertheless be free to rock round hub 1, in passing over uneven ground, and it can also follow, in the case of a steering wheel, the various directions in which the wheel will be set by the steering gear of the vehicle.

It is equally apparent that any lateral strains to which the runner or ski may be subjected will be transmitted to the axle through struts 3, collar 2, arm 5 and spindle 6 without affecting the hub.

Having now particularly described and ascertained the nature of my said invention and the manner in which the same is to be performed, what I claim is:

1. The combination of a vehicle wheel; a spindle about which the wheel is adapted to turn; a collar loosely encircling the hub of the wheel and having a pair of spaced shoulders on its upper portion; a runner; a pair of diverging struts secured at their upper ends to the lower portion of the collar and at their lower ends to the runner; an arm mounted with a slight degree of friction on the spindle and engaged at its outer end between said shoulders; and a spring device carried by said arm end for coaction with said shoulders to yieldingly lock the runner in a balanced position clear of the ground, and to absorb shocks to which the runner may be subjected.

2. The combination of a vehicle wheel; a spindle about which the wheel is adapted to turn; a collar loosely encircling the hub of the wheel and having a pair of spaced shoulders on its upper portion, said shoulders having notches in their inner faces; a runner; a pair of diverging struts secured at their upper ends to the lower portion of the collar and at their lower ends to the runner; an arm mounted with a slight degree of friction on the spindle and having its outer end fitting between said shoulders and formed with an open-ended transverse recess; balls seated in the open ends of said recess; and a spring in said recess tending to force said balls into said notches and thereby yieldingly lock the runner in a balanced position clear of the ground, and to absorb shocks to which the runner may be subjected.

In testimony whereof I have signed this specification in the presence of a subscribing witness.

ADOLPHE KÉGRESSE.

Witness:
CHARLES LÉON LOISEL.